United States Patent [19]

Taylor

[11] Patent Number: 5,062,049
[45] Date of Patent: Oct. 29, 1991

[54] CONTROL METHOD AND APPARATUS FOR CONTINUOUSLY VARIABLE TRANSMISSIONS

[75] Inventor: Danny R. Taylor, Groton, N.Y.

[73] Assignee: Borg-Warner Automotive, Inc., Sterling Heights, Mich.

[21] Appl. No.: 408,170

[22] Filed: Sep. 15, 1989

[51] Int. Cl.⁵ ............................................. B60K 41/18
[52] U.S. Cl. .................................... 364/424.1; 74/866
[58] Field of Search .............. 364/424.1; 74/866, 867; 474/11; 192/0.032, 0.052, 3.58

[56] References Cited

U.S. PATENT DOCUMENTS

| Re. 31,361 | 8/1983 | Smirl . | |
|---|---|---|---|
| 4,433,594 | 2/1984 | Smirl . | |
| 4,458,318 | 7/1984 | Smit et al. . | |
| 4,468,988 | 9/1984 | Hiramatsu | 74/866 |
| 4,542,665 | 9/1985 | Yamamura et al. . | |
| 4,566,354 | 1/1986 | Kumura et al. . | |
| 4,583,627 | 4/1986 | Kumura et al. . | |
| 4,631,043 | 12/1986 | Tokoro et al. . | |
| 4,648,496 | 3/1987 | Petzold et al. . | |
| 4,653,621 | 3/1987 | Oshiage . | |
| 4,663,714 | 5/1987 | Cornell et al. . | |
| 4,665,773 | 5/1987 | Hiramatsu et al. . | |
| 4,718,525 | 1/1988 | Yamaguchi | 192/0.052 |
| 4,723,644 | 2/1988 | Sakakiyama | 192/0.052 |
| 4,724,939 | 2/1988 | Lockhart et al. | 192/3.31 |
| 4,730,711 | 3/1988 | Sakakiyama | 192/0.052 |
| 4,766,544 | 8/1988 | Kurihara et al. | 192/3.58 |
| 4,793,454 | 12/1988 | Petzold et al. . | |
| 4,811,225 | 3/1989 | Petzold et al. . | |
| 4,909,103 | 3/1990 | Morimoto et al. | 74/866 |
| 4,926,716 | 5/1990 | Hirano et al. | 364/424.1 |
| 4,956,972 | 9/1990 | Sasajima et al. | 364/424.1 |

FOREIGN PATENT DOCUMENTS

0139277  5/1985  European Pat. Off. .
0196807  10/1986  European Pat. Off. .

Primary Examiner—Parshotam S. Lall
Assistant Examiner—V. Trans
Attorney, Agent, or Firm—Hugh A. Abrams; Greg Dziegielewski

[57] ABSTRACT

A control system for continuously variable transmissions is operative in a number of functional modes. A "neutral mode" fully disengages a clutch and sets a variable ratio to an extreme low ratio when a gear shift is in a neutral position. A "hold mode" slightly engages the clutch to cause a finite amount of vehicle creep when the gear shift is in a forward or reverse position and a throttle is fully released. A "normal start mode" partially engages the clutch when the gear shift is in a forward or reverse position and the throttle is depressed. A "drive mode" fully engages the clutch and sets the variable ratio to maintain a predetermined engine speed when the vehicle is travelling at greater than a predetermined minimum vehicle speed and the clutch is slipping at less than a predetermined amount of clutch slip.

13 Claims, 7 Drawing Sheets

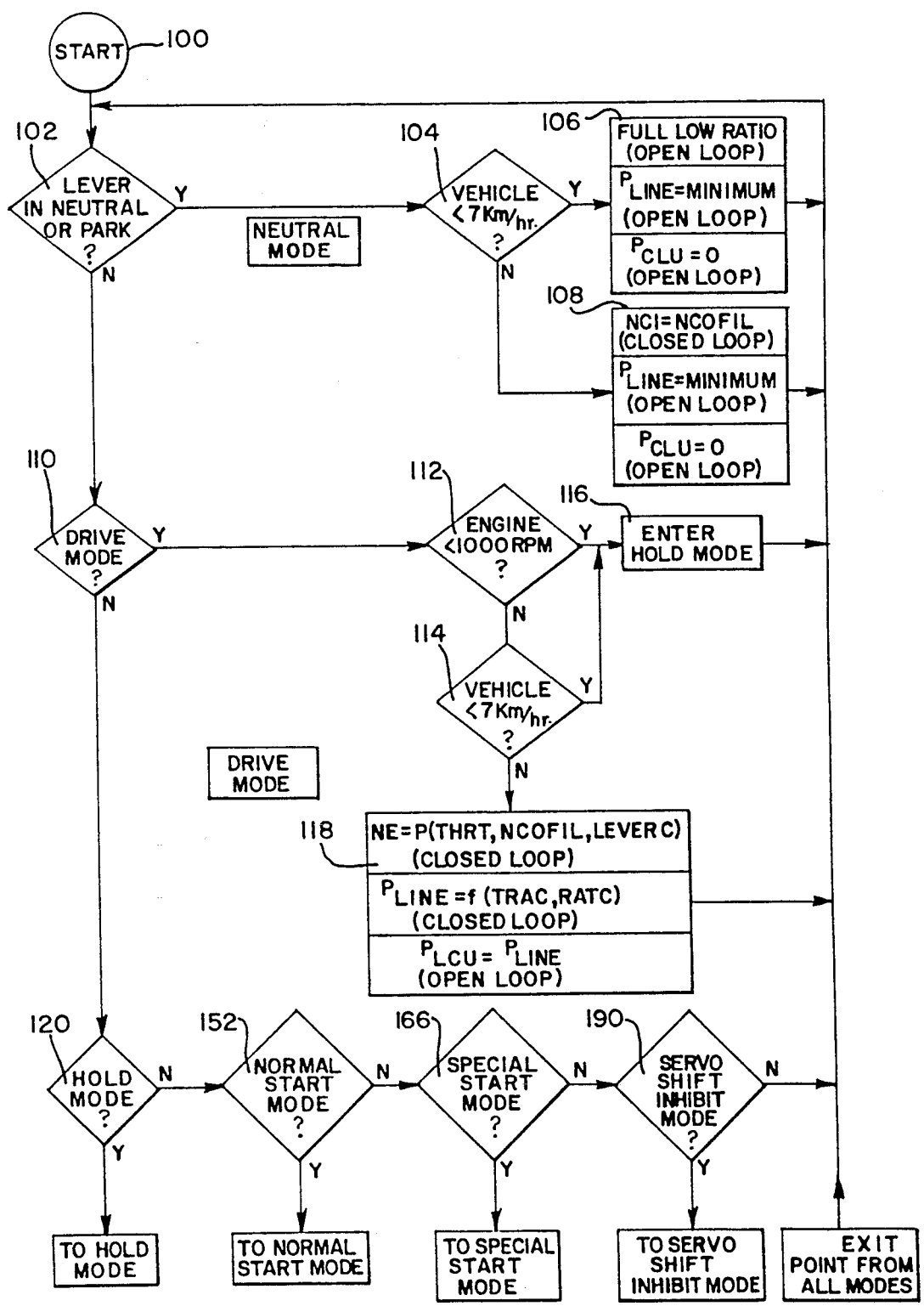

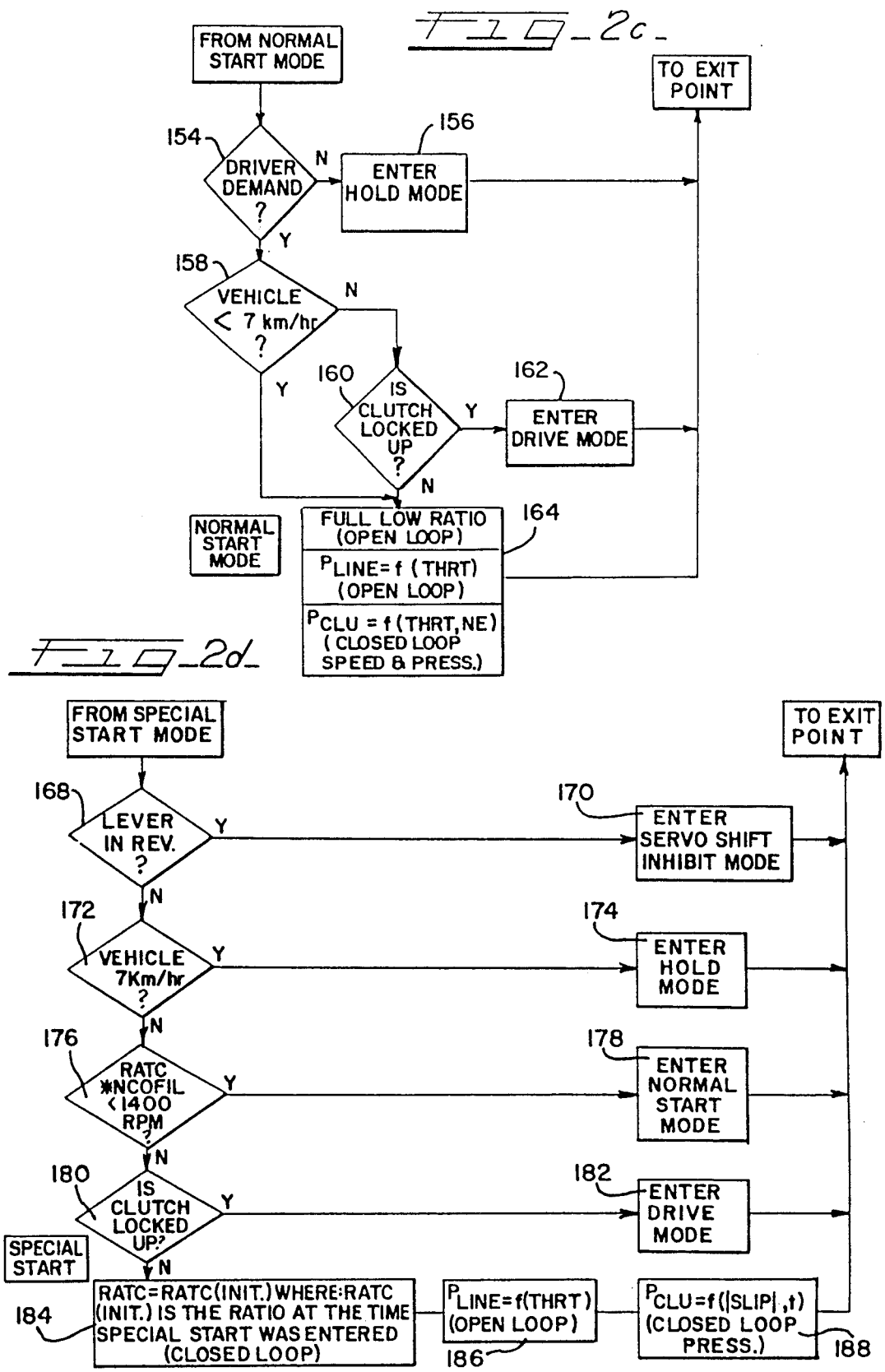

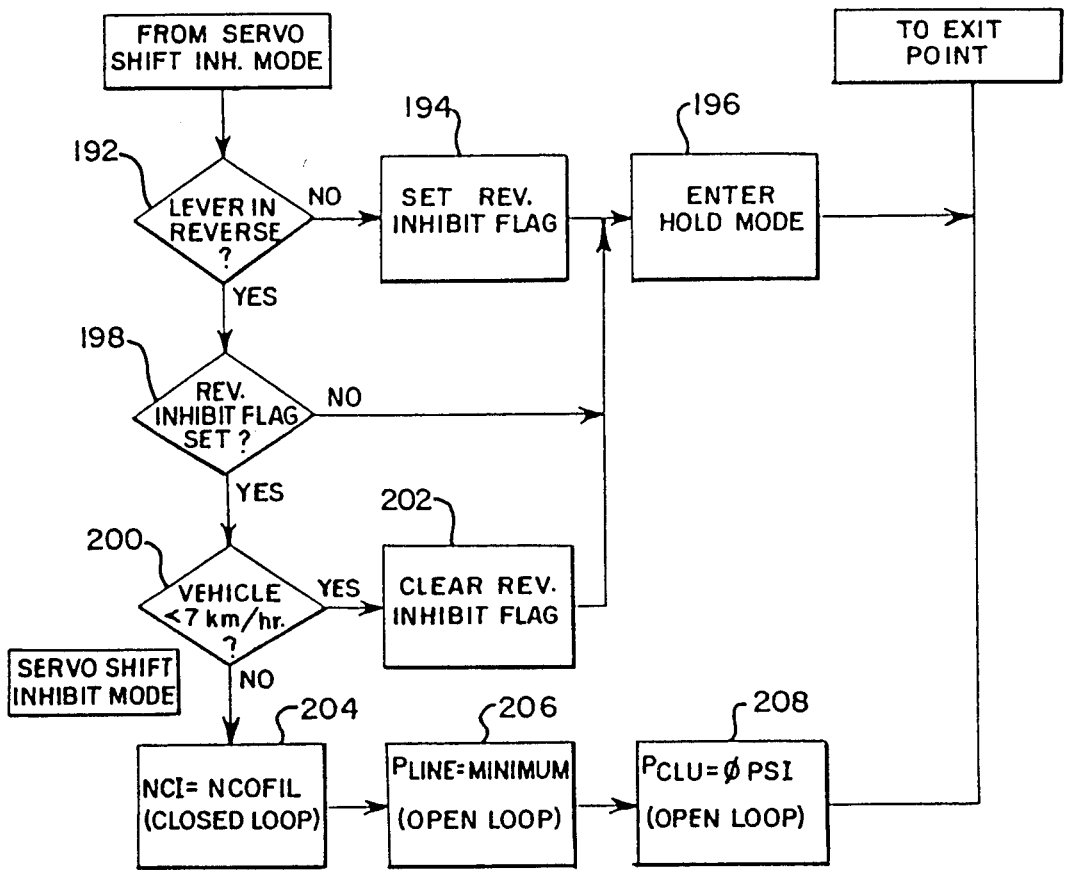
FIG-2e-
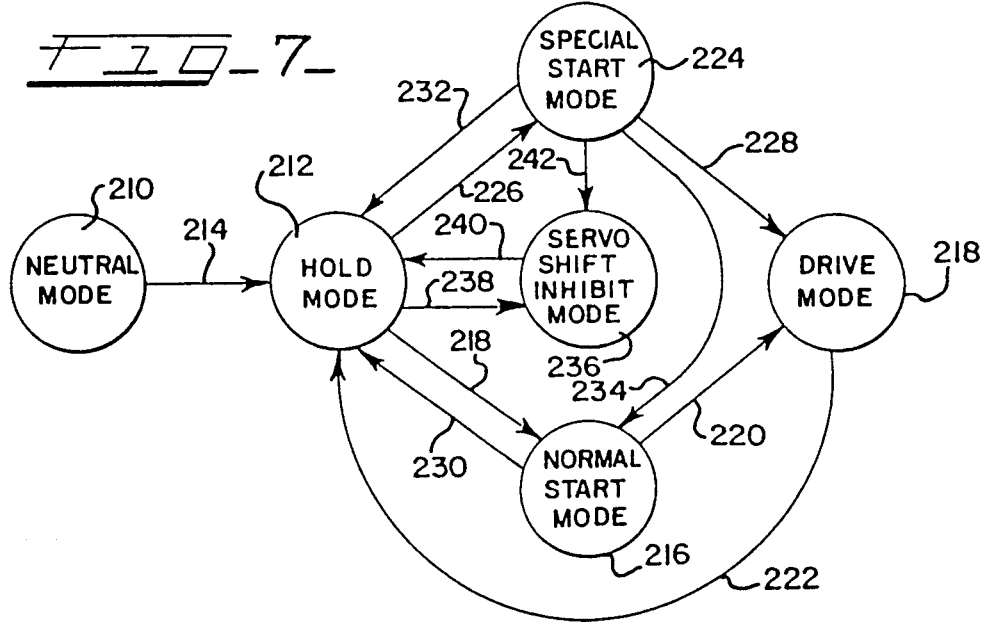
FIG-7-

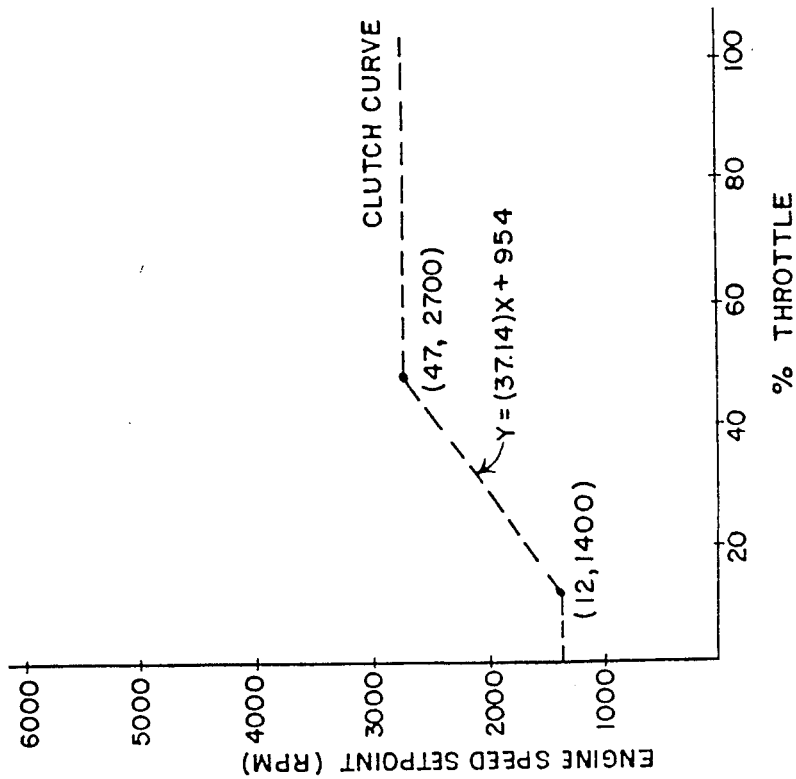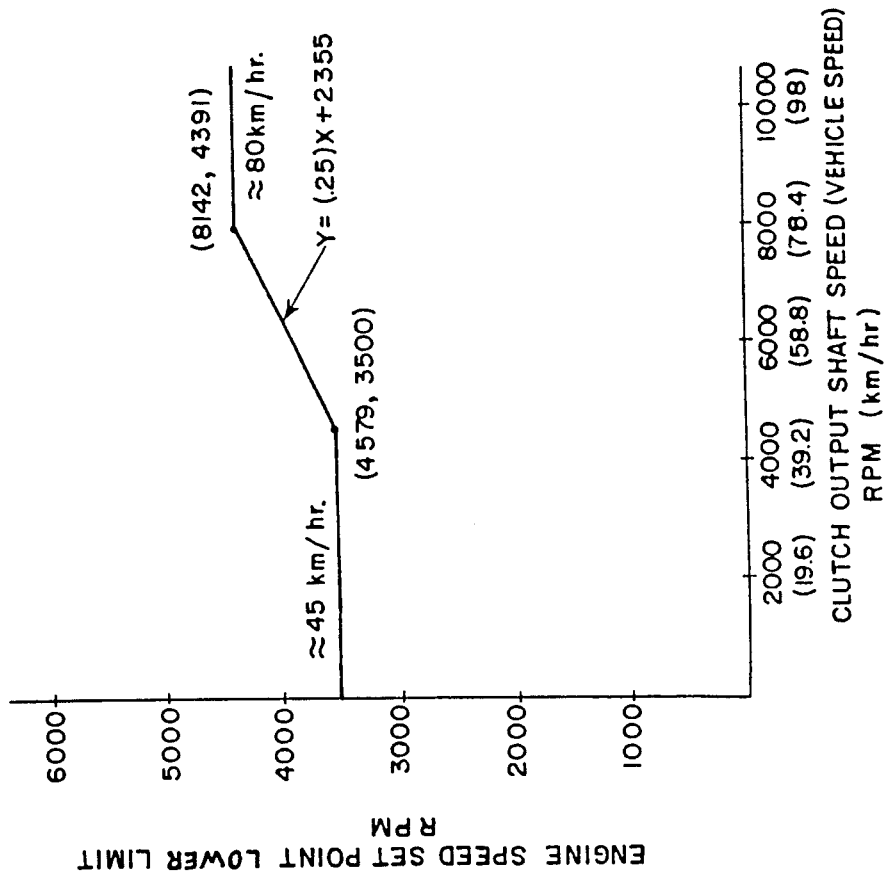

CONTROL METHOD AND APPARATUS FOR CONTINUOUSLY VARIABLE TRANSMISSIONS

FIELD OF THE INVENTION

The present invention relates generally to vehicular power transmission systems, and more particularly to control methods and apparatus for continuously variable vehicular transmission systems.

BACKGROUND OF THE INVENTION

A continuously variable transmission (CVT) can be used in a powered vehicle, such as a passenger automobile, for coupling engine power to the driving wheels. Unlike typical transmissions which utilize a number of discrete "gear ratios", CVT's utilize a mechanism whereby the effective gear ratio of the transmission is continuously variable within a predetermined range. The effective gear ratio of a CVT in use at any given time is a function of many variables such as engine load and power output.

A control system is used in conjunction with a CVT to monitor input variables and provide signals to control system parameters such as effective gear ratio and clutch engagement. Such a control system must be economical and efficient, and, especially in a passenger vehicle application, it must cause the CVT to operate smoothly, with little or no hesitation, jerking freewheeling or other performance aberrations that would be unsettling to a driver or passenger.

It is therefore an object of the present invention to provide a control system for continuously variable transmissions that generally overcomes the shortcomings and deficiencies of the prior art.

It is a further object of the present invention to provide such a control system that results in good drivability.

It is also an object of the present invention to provide such a control system that enables ample vehicle performance and fuel economy.

SUMMARY OF THE INVENTION

The present invention accomplishes the foregoing and other objects by providing a control method and apparatus for continuously variable transmissions that is operative in a number of functional modes. A "neutral mode" fully disengages a clutch and sets a variable chain ratio equal to an extreme low ratio in response to a gear shift lever being in a neutral position. A "hold mode" slightly engages the clutch to cause a finite amount of vehicle creep and sets the variable ratio equal to the extreme low ratio in response to the gear shift being in a forward or reverse position at a time when a throttle of the vehicle is in a fully released position and either the vehicle is travelling at less than a predetermined minimum vehicle speed or the engine is rotating at less than a predetermined minimum engine speed.

A "normal start mode" partially engages the clutch to a degree sufficient to maintain the rotational speed of the engine at a predetermined set point value which is a function of the throttle position. The normal start mode further sets the variable ratio equal to the extreme low ratio. The normal start mode is entered when the gear shift lever is in a forward or reverse position and the vehicle is travelling at less than the predetermined minimum vehicle speed at a time when the throttle is moved to a depressed position.

A "special start mode" partially engages the clutch to a degree proportional to both the passage of time and the difference between the rotational speeds of the clutch input shaft and the clutch output shaft. The special start mode further sets the variable ratio to a fixed value. The special start mode is entered when the gear shift is in a forward or neutral position and the vehicle is travelling at greater than the predetermined minimum vehicle speed at a triggering time when either the throttle is moved to a depressed position or the rotational speed of the clutch output shaft is multiplied by the fixed value is within a predetermined range or the gear shift is in a position calling for a manual low ratio or the variable ratio is equal to the extreme high ratio. In this mode, the fixed value is the ratio at the triggering time.

A "drive mode" fully engages the clutch and sets the variable ratio to maintain a predetermined engine set point speed, where the engine set point speed is a function of throttle position. The drive mode is entered when the gear shift is in a forward or reverse position and the vehicle is travelling at greater than the predetermined minimum vehicle speed at a time when the throttle is in a depressed position and the difference between the rotational speeds of the clutch input shaft and the clutch output shaft is less than a predetermined amount of clutch slip.

A "servo shift inhibit mode" fully disengages the clutch and sets the variable ratio to equalize the rotational speeds of the clutch input shaft and the clutch output shaft. The servo shift inhibit mode is entered when the gear shift is moved to a reverse position at a time when the vehicle is travelling forward at greater than the predetermined minimum vehicle speed.

BRIEF DESCRIPTION OF THE DRAWINGS

FIGS. 2a-2e is a flow chart illustrating an implementation of the CVT control system of the present invention.

FIG. 5 is a graph illustrating the engine speed set point lower limit as a function of clutch output shaft speed when the gear shift is in the manual 2 position.

FIG. 6 is a graph illustrating the engine speed set point in the normal start mode as a function of throttle position.

FIG. 7 is a state diagram of one embodiment of the CVT control system of the present invention.

DETAILED DESCRIPTION

Figure 1:
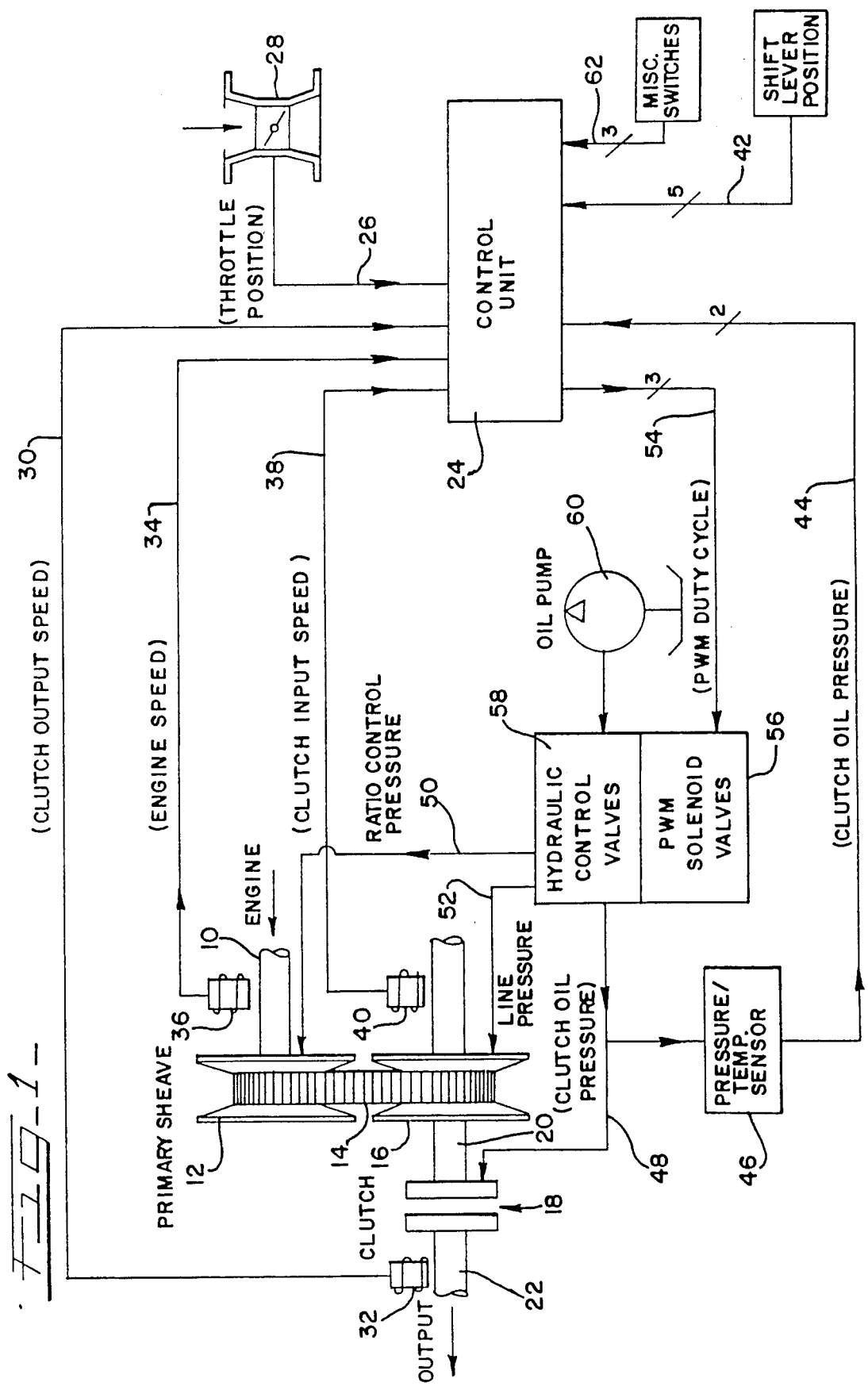
FIG. 1 is a schematic diagram of a continuously variable transmission system which includes the control method and apparatus of the present invention.
Figure 2B:
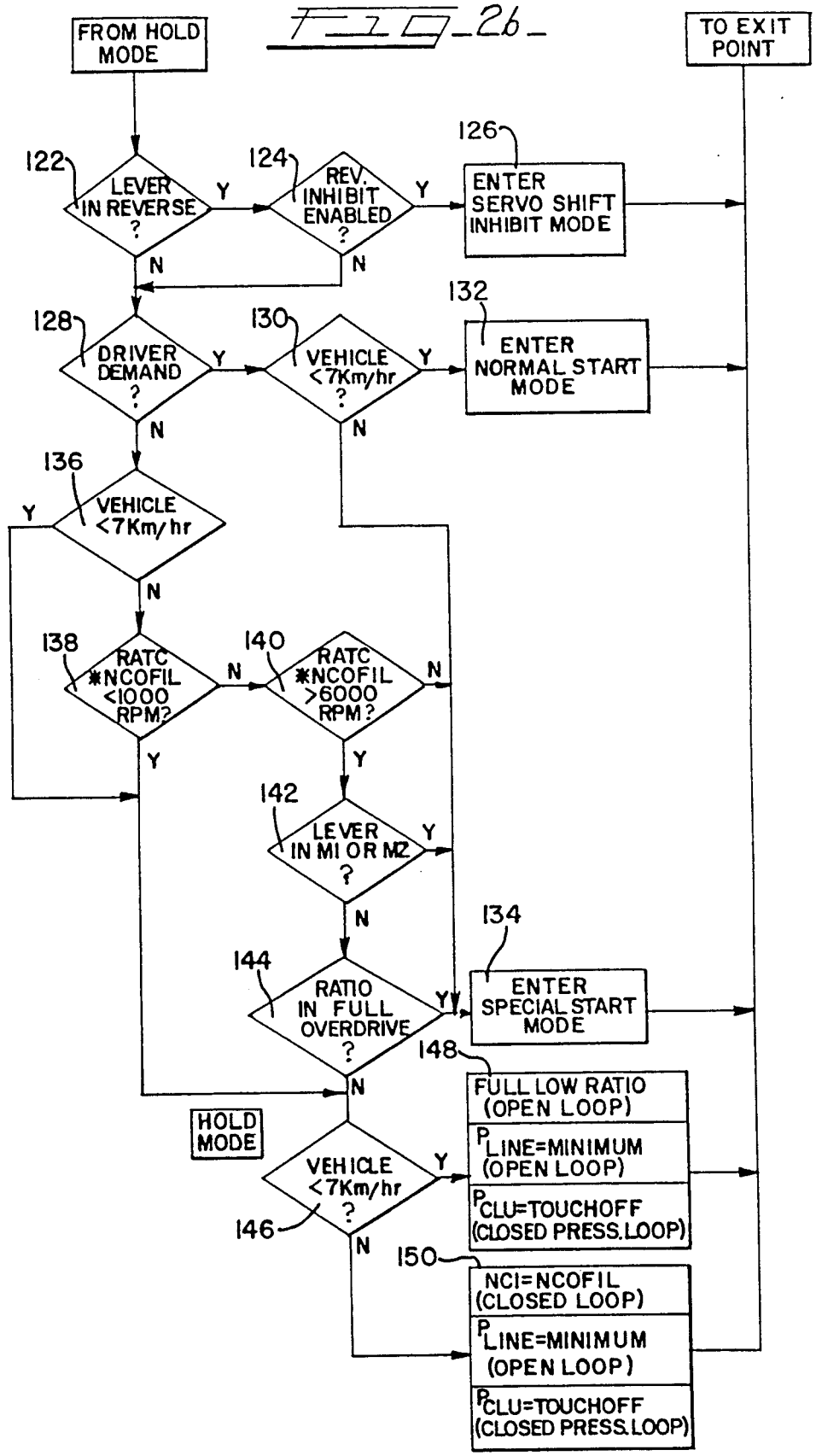

FIG. 1 is a schematic illustration of a CVT system which includes the control method and apparatus of the present invention. An engine (not shown) develops power and torque and provides the power and torque at engine output shaft 10. Engine output shaft 10 is coupled to a primary sheave or pulley 12. A flexible metal chain or belt 14 is driven by the primary sheave 12 and, in turn, drives a secondary sheave 16. Secondary sheave 16 is coupled to clutch 18 via shaft 20. Engine power is thereby transmitted via primary sheave 12, chain 14, secondary sheave 16 and shaft 20 to clutch 18, which serves to engage and disengage the engine power and torque from clutch output shaft 22. Clutch output shaft 22 is coupled to the driving wheels of the vehicle in a suitable well known manner such as by way of a differential and drive axles.

The CVT thus described serves to vary the effective gear ratio of the transmission by varying the relative diameters of primary sheave 12 and secondary sheave 16. Clutch 18 provides a means by which the engine can be disengaged from the driving wheels of the vehicle so, for example, when the vehicle is at rest, the engine can remain running. Furthermore, by slowly and slipably engaging, the clutch provides a means by which the vehicle can be started from rest in a smooth and comfortable manner.

Control of the relative sheave diameters and control of the degree of engagement of the clutch 18 is effected by a control system having an electronic control unit 24, which may be any suitable microcomputer circuit. Control unit 24 receives a throttle position input signal on line 26 from throttle 28. The throttle position input signal on line 26 may be, for example, a voltage level from a transducer (not shown) at throttle 28 that is proportional to the amount of throttle opening. Control unit 24 receives a clutch output speed signal on a line 30 from a speed transducer 32 located adjacent to output shaft 22. The clutch output speed signal on line 30 may, for example, be proportional to the speed of rotation of output shaft 22. Control unit 24 receives an engine speed signal on a line 34 from a speed transducer 36 located adjacent to engine output shaft 10. The engine speed signal may, for example, be proportional to the speed of rotation of the engine (not shown). Control unit 24 further receives a clutch input speed signal on a line 38 from a speed transducer 40 located adjacent to shaft 20. The clutch input speed signal on line 38 may, for example, be proportional to the speed of rotation of shaft 20, which is the input to clutch 18.

Control unit 24 also receives a shift lever position signal on line 42 from the gear shift (not shown). The shift lever position signal on line 42 may, for example, indicate whether the shift lever is in neutral, reverse, drive, manual 2 or manual 1 position. Control unit 24 receives a "clutch oil pressure" signal on a line 44 from a pressure transducer 46. The clutch oil pressure signal on line 44 may, for example, be proportional to the pressure of the hydraulic oil or fluid in fluid line 48 which is used to control the engagement of clutch 18, as more fully described below. In addition to the inputs to the control unit 24 described above, there is also a "driver demand" input on a line 62 which is coupled to a driver demand switch at the throttle pedal of the vehicle and indicates when the throttle pedal is being depressed by the driver.

Pursuant to the invention, control unit 24 functions to control three hydraulic pressures that, in turn, control the operation of the CVT: (1) The clutch oil pressure in hydraulic line 48, (2) a "ratio control pressure" in a hydraulic line 50, and (3) a "line pressure" in a hydraulic line 52. The ratio control pressure in hydraulic line 50 is used to control the relative diameters of primary sheave 12 and secondary sheave 16 as more fully described below. The line pressure in hydraulic line 52 is used to insure that, under varying load conditions, the chain 14 does not slip on the primary sheave 12 and the secondary sheave 16. The hydraulic pressures in lines 48, 50 and 52, which control the operation of the CVT, are controlled by the control unit 24. Control unit 24 generates pulse width modulated control signals on line 54. The pulse width modulated control signals on line 54 control electro-hydraulic solenoid valves 56 which in turn control hydraulic spool valves 58 which operate as flow and/or pressure amplifiers. An oil pump 60 provides hydraulic pressure which is modulated by valves 58 for each of the hydraulic lines 48, 50, and 52. Thus, by varying the duty cycles of the pulse width modulated control signals on line 54, the control unit can control the hydraulic pressures and/or flows in hydraulic lines 48, 50 and 52, and thereby control the operation of the CVT.

By controlling the flow of hydraulic fluid or oil into or out of the primary sheave 12, via hydraulic line 50, a desired effective gear ratio in the CVT can be attained. The line pressure in hydraulic line 52, applied to the secondary sheave 16, results in a clamping force on chain 14. The required amount of line pressure in hydraulic line 52 is determined by the amount of torque that is required to be transmitted to the driving wheels. In order to transfer the desired torque to the driving wheels, through the sheaves/chain system, without slipping the chain, the proper amount of clamping force must be applied to the chain by the sheaves 12, 16. This is accomplished by presenting the proper amount of line pressure via hydraulic line 52 to the hydraulic actuators in secondary sheave 16.

In the preferred embodiment, there are six operational modes of the control system of the present invention. There is a "neutral mode" which is entered whenever the shift lever (not shown) is in the "neutral" or "park" position. In this mode, no action is being requested by the driver to place the vehicle in motion. There is a "hold mode" which is entered when the shift lever is in a "reverse", "drive", "manual 1" or "manual 2" position, but no action is being requested by the driver. The manual 1 and manual 2 positions are positions that call for a ratio which is lower than that which would result in the drive position. Manual 1 calls for a lower ratio than manual 2. The control system would be in the hold mode when, for example, the vehicle is stopped at a traffic light yet the engine is running and the shift lever is in the drive position. There is a "normal start mode" which is entered when the vehicle is started from a complete or near stop.

There is a "special start mode" which is entered when the transmission is started from other than a near or complete stop. The control system would enter this mode, for example, when the driver shifts into neutral to coast down a hill and then shifts back into drive at the bottom. Another situation where the control system would enter the special start mode would be when a panic stop is encountered where the driving wheels of the vehicle are locked up and then are unlocked suddenly when the driver releases pressure on the brake pedal before the vehicle has come to a complete or near stop. There is a "drive mode" which is entered when the vehicle has been sufficiently started in either the normal start mode or the special start mode. It is in this mode that the control system, in normal operation, would spend the vast majority of time. Finally, there is a "servo-shift inhibit mode" which is entered when the driver attempts to shift the shift lever into reverse at a time when the vehicle is traveling forward at a relatively high speed. In this mode, the transmission system is disengaged to prevent loss of control of the vehicle or damage to the transmission resulting from such a driver maneuver.

Referring to FIGS. 2a-2e, a flow chart is shown which illustrates the control events that occur in each of the modes described briefly above. The control system is started at start block 100. At decision block 102 the control system determines whether the shift lever is either in neutral or in park. If the shift lever is in neutral or in park, then the control system will be operating in the neutral mode. In such a case, a decision is then made at decision block 104 as to whether the vehicle speed is less than a predetermined minimum vehicle speed which, in the illustrated embodiment, is 7 kilometers per hour. If the outcome of decision block 104 is affirmative, that is, in other words, if the vehicle speed is less than 7 kilometers per hour, then the ratio control pressure on hydraulic line 50 of FIG. 1 is adjusted at block 106 so that the CVT will have the lowest possible effective gear ratio. As used herein, "low ratio" is a ratio that would cause the engine to turn at a relatively high speed for a given vehicle speed, and "high ratio" is a ratio that would cause the engine to turn at a relatively low speed for a given vehicle speed. Also at block 106, the line pressure on hydraulic line 52 of FIG. 1 is adjusted so that it will have a minimum value of, for example, 60 pounds per square inch (psi). Finally, at block 106, the clutch oil pressure in hydraulic line 48 of FIG. 1 is adjusted so that clutch 18 will be fully disengaged.

If, from decision block 104, the vehicle speed has been determined to be not less than 7 kilometers per hour, then, at block 108, the ratio control pressure will be controlled to allow smooth clutch engagement at whatever speed the vehicle is traveling. That is, the ratio is controlled to minimize clutch slip in the event that clutch engagement should be called for. This is accomplished by adjusting the effective gear ratio of the CVT so that the clutch input speed closely matches the clutch output speed. Also at block 108, the line pressure is controlled to a minimum value of, for example, 60 psi. Finally, at block 108, the clutch oil pressure is adjusted so that clutch 18 is fully disengaged.

If, from decision block 102, it is found that the control system is not in the neutral mode, an inquiry is made at decision block 110 as to whether the control system is in the drive mode. If the control system is in the drive mode, then an inquiry is made at decision block 112 as to whether the engine speed is less than a predetermined minimum engine speed which, in the illustrated embodiment, is 1,000 revolutions per minute (rpm). If the engine speed is not less than 1,000 rpm, then an inquiry is made at decision block 114 as to whether the vehicle speed is less than 7 kilometers per hour. If either the engine speed is less than 1,000 rpm, from decision block 112, or the vehicle speed is less than 7 kilometers per hour, from decision block 114, then, at block 116 the control system is caused to enter the hold mode. If, in the drive mode, the engine speed is not less than 1,000 rpm and the vehicle speed is not less than 7 kilometers per hour, then, at block 118, the line pressure, in hydraulic line 52 of FIG. 1, is controlled to be a function of engine torque, chain ratio, engine speed and gear shift position.

When the gear shift is in the reverse or manual 1 position, line pressure is a function of engine torque and engine speed. The engine speed is used to compensate for centrifugal effects. Since full low ratio is called for when the gear shift is in the reverse or manual 1 position, the line pressure must be greater than when in the drive position in order to maintain full low ratio. This is because centrifugal effects tend to force an "upshift", and, to resist the "upshift" tendency, a higher secondary sheave force is required. Thus, the line pressure, at block 118, when the gear shift is in the reverse or manual 1 position, is controlled as follows:

$$P_{line} = 5.2(Te) + 50 + 0.056(Ne - 2500)$$

where Te is engine torque in foot-pounds and Ne is engine speed in revolutions per minute. The third term is limited to only positive values, and the line pressure itself is limited between 60 psi and 210 psi.

When the gear shift is in the manual 2 or drive position, line pressure is a function of engine torque and chain ratio. The line pressure, at block 118, when the gear shift is in the manual 2 or drive position, is controlled as follows:

$$P_{line} = 2.37(Te)(Rc) + 40$$

where Te is engine torque in foot-pounds and Rc is the chain ratio. Again, the line pressure is limited between 60 psi and 210 psi.

Also at block 118, the clutch oil pressure is controlled so that the clutch remains in the fully engaged position. This is accomplished by causing the clutch oil pressure to be equal to the line pressure.

Finally, at block 118, the ratio control pressure is controlled also depending upon the position of the shift lever. If the shift lever is in the reverse position, the ratio control pressure will adjust the effective gear ratio, or chain ratio, of the CVT so that it will be maintained in a full low gear ratio. If the shift lever is in the manual 1 position the effective gear ratio of the CVT, or the chain ratio, will be adjusted to a certain specific value, as follows. If a shift to manual 1 is made at high vehicle speeds, the ratio will be limited so as to not overspeed the engine, yet still offer a large amount of engine braking. As the vehicle speed decreases, the ratio is controlled to progressively lower values until full low gear ratio is reached. Once this occurs, the CVT will remain in full low no matter how much the vehicle speed increases. This should offer maximum engine braking. The desired ratio, therefore, is controlled so as to maintain or achieve a desired engine speed value.

If, at block 118, the shift lever is in the manual 2 position, a small amount of engine braking or a small amount of increased performance will be achieved. This is accomplished by limiting the chain ratio range so that it is never allowed into full overdrive (i.e., full high ratio), but is rather limited to some lower effective gear ratio value. Under operating conditions that would normally call for lower ratios than the limit just described, the ratio control pressure operates as if the gear shift were in the drive position as described below. This would occur at relatively lower vehicle speeds and higher throttle positions. On the other hand, when it is detected that the ratio would otherwise go further into overdrive than the limited value described above, the ratio is instead limited to this value until a downshift is requested, at which time normal engine speed control is again initiated.

Figure 4:
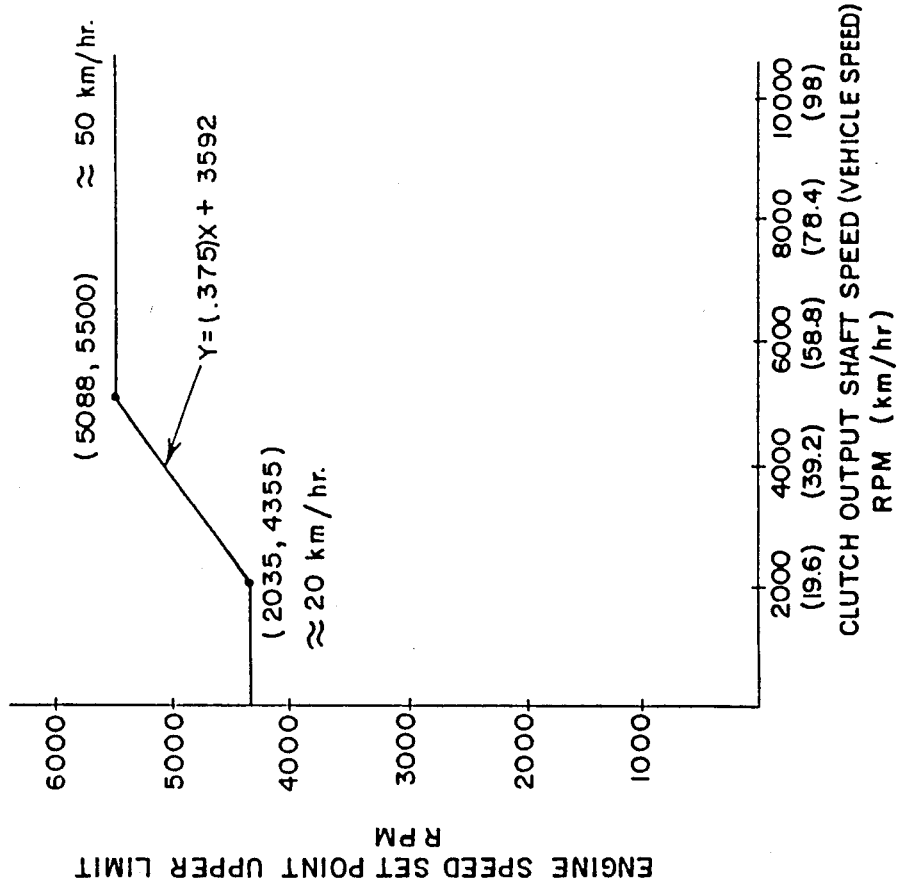
FIG. 4 is a graph illustrating the engine speed set point upper limit as a function of clutch output shaft speed.
Figure 3:
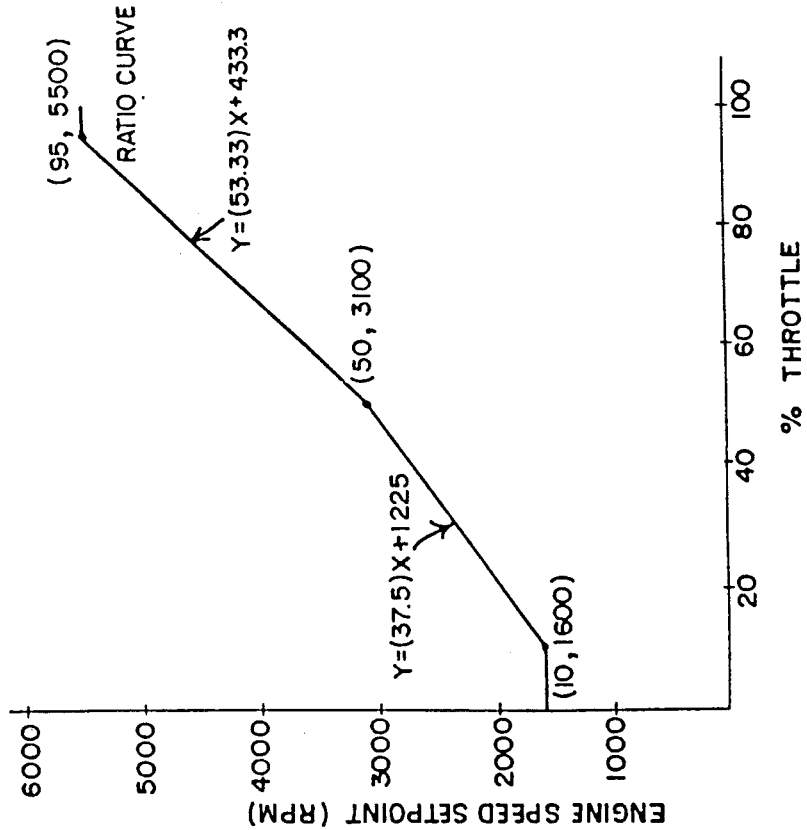
FIG. 3 is a graph illustrating the desired engine speed set point in the drive mode as a function of throttle position.

If, at block 118, the gear shift is in the drive position, the effective gear ratio of the CVT is controlled via the ratio control pressure in hydraulic line 50 of FIG. 1 in a closed loop fashion so as to control the engine speed to a particular desired value which is a function of the throttle position and of vehicle speed. The ratio is controlled to maintain a certain engine speed which is a function of the amount of throttle opening. This is shown in FIG. 3, which illustrates the desired engine speed "set point" as a function of throttle position. There is, however, an upper limit on the engine speed set point which is a function of vehicle speed. This limits the audible noise at low vehicle speeds by limiting the engine speed to relatively lower values, while allowing higher performance at higher vehicle speeds by setting higher engine speed set points when noise is not of such a concern. FIG. 4 illustrates how the upper engine speed set point limit varies as a function of the speed of the clutch output shaft (which is proportional to the vehicle speed).

The upper limit on the gear ratio in the manual 2 position is actually achieved by placing a lower limit on the engine speed set point that would otherwise be dictated by the relationship of FIG. 3. FIG. 5 illustrates how the lower limit on the engine speed set point varies as a function of the speed of the clutch output shaft (which is proportional to the vehicle speed). This lower limit affords a small amount of engine braking at low vehicle speeds, increasing to moderate braking at higher speeds. Also, since a lower limit is applied, the kickdown performance is increased over that in the drive position.

Returning now to FIG. 2, if, from decision block 110, it is determined that the control system is not in the drive mode, an inquiry is made at decision block 120 as to whether the control system is in the hold mode. If the control system is in the hold mode, an inquiry is then made at decision block 122 as to whether the shift lever is in reverse. If it is in reverse, an inquiry is made at decision block 124 as to whether the reverse inhibit is enabled. If so, at block 126 the servo-shift inhibit mode is entered. If, however, from decision block 122, it is found that the shift lever is not in reverse, or it is found from decision block 124 that the reverse inhibit is not enabled, then an inquiry is made at decision block 128 as to whether the driver demand switch is engaged. If so, an inquiry is made at decision block 130 as to whether the vehicle speed is less than 7 kilometers per hour. If so, at block 132, the control system is caused to enter the normal start mode. If, however, from decision block 130 it is found that the vehicle speed is not less than 7 kilometers per hour, then, at block 134, the special start mode is entered.

If, from decision block 128, it is determined that the driver demand switch is not engaged, then an inquiry is made at decision block 136 as to whether the vehicle speed is less than 7 kilometers per hour. If the vehicle speed is not less than 7 kilometers per hour, an inquiry is made at decision block 138 as to whether the speed of the clutch output shaft multiplied by the chain ratio is less than 1,000 rpm. If it is not less than 1,000 rpm, an inquiry is made at decision block 140 as to whether the speed of the clutch output shaft multiplied by the chain ratio is greater than 6,000 rpm. If so, then an inquiry is made at decision block 142 as to whether the shift lever is in the manual 1 or manual 2 position. If not, then an inquiry is made at decision block 144 as to whether the ratio control pressure is such that the CVT is in full overdrive. If, at decision block 140, it is found that the speed of the clutch output shaft multiplied by the chain ratio is not greater than 6,000 rpm, or it is found from decision block 142 that the shift lever is in the manual 1 or the manual 2 position, or it is found from decision block 144 that the ratio of the CVT is in full overdrive, then the special start mode is entered at block 134. However, if from decision block 144 it is found that the ratio of the CVT is not in full overdrive, or it is found from decision block 138 that the speed of the clutch output shaft multiplied by the chain ratio is less than 1,000 rpm, or it is found from decision block 136 that the vehicle speed is less than 7 kilometers per hour, then an inquiry is made at decision block 146 as to whether the vehicle speed is less than 7 kilometers per hour. If it is found from decision block 146 that the vehicle speed is less than 7 kilometers per hour, then, at block 148, the ratio control pressure is adjusted to cause a full low ratio condition of the CVT. Also, at block 148, the line pressure is controlled to a minimum value of, for example, 60 psi. Finally, at block 148, the clutch oil pressure is controlled to a small fixed value, in order to maintain a desired amount of vehicle creep. The control effected at block 148 represents a situation such as when the vehicle is stopped at a stop light and the driver has his foot on the brake with the gear shift in a forward position. If the driver were to take his foot off of the brake pedal, the small amount of clutch oil pressure will cause a slight degree of clutch engagement, leading to a fixed amount of vehicle creep. If from decision block 146, it is found that the vehicle speed is not less than 7 kilometers per hour, then, at block 150, the ratio control pressure is adjusted to maintain an effective gear ratio so as to maintain equality between the speed of the clutch input shaft and the speed of the clutch output shaft, regardless of engine speed. Also at block 150, the line pressure is controlled to a minimum value of, for example, 60 psi. And finally, at block 150, as at block 148, the clutch oil pressure is controlled to a small fixed value for purposes of maintaining a desired amount of vehicle creep.

If from decision block 120 it is found that the control system is not in the hold mode, then an inquiry is made at decision block 152 as to whether the control system is in the normal start mode. If from decision block 152, it is found that the control system is in the normal start mode, then an inquiry is made at decision block 154 as to whether the driver demand switch is engaged. If it is not engaged, then, at block 156 the control system is caused to enter the hold mode. If, however, from decision block 154, it is found that the driver demand switch is engaged, then an inquiry is made at decision block 158 as to whether the vehicle speed is less than 7 kilometers per hour. If it is found that the vehicle speed is not less than 7 kilometers per hour, then an inquiry is made at decision block 160 as to whether the clutch is fully engaged. If it is found that the clutch is fully engaged, then, at block 162, the control system is caused to enter the drive mode. If, however, from decision block 158 it is found that the vehicle speed is less than 7 kilometers per hour, or it is found from decision block 160 that the clutch is not fully engaged, then, at block 164, the ratio control pressure is adjusted to cause the effective gear ratio of the CVT to be a full low ratio.

Also, at block 164, the line pressure present in hydraulic line 52 of FIG. 1 is controlled to be a function of throttle position. The line pressure varies with throttle opening according to the maximum torque developed by the engine at any given throttle opening. Finally, at block 164 the clutch oil pressure is controlled so as to maintain a particular engine speed. The desired engine speed to be maintained is a function of throttle position and is shown in FIG. 6. In this manner, the clutch is slowly engaged and is allowed to slip as the vehicle is started from a stop.

If from decision block 152 it is found that the control system is not in the normal start mode, then an inquiry is made at decision block 166 as to whether the control system is in the special start mode. If so, then an inquiry is made at decision block 168 as to whether the gear shift is in the reverse position. If so, then, at block 170, the control system is caused to enter the servo-shift inhibit mode. If from decision block 168, it is found that the gear shift is not in the reverse position, then an inquiry is made at decision block 172 as to whether the vehicle speed is less than 7 kilometers per hour. If it is found that the vehicle speed is less than 7 kilometers per hour, then the control system is caused, at block 174, to enter the hold mode. If however from decision block 172, it is found that the vehicle speed is not less than 7 kilometers per hour, then another inquiry is made at decision block 176 as to whether the speed of the clutch output shaft multiplied by the chain ratio is less than 1,400 rpm. If so, then, at block 178, the control system is caused to enter the normal start mode. If from decision block 176, it is found that the speed of the clutch output shaft multiplied by the chain ratio is not less than 1,400 rpm, then an inquiry is made at decision block 180 as to whether the clutch is fully engaged. If so, then the control system, at block 182, is caused to enter the drive mode. If, however, at decision block 180 it is found that the clutch is not fully engaged, then, at block 184, the ratio control pressure is controlled to maintain the effective gear ratio of the CVT that was in effect when the special start mode was entered. Then, at block 186 the line pressure is controlled to be a function of throttle position, as it is in the normal start mode described above. Next, at block 188 the clutch oil pressure is controlled as a function of the amount of clutch slip and time. The clutch is steadily engaged by increasing the clutch oil pressure with time starting at the current clutch pressure and proceeding to a value close to the current value of line pressure. The rate at which the clutch oil pressure increases is inversely proportional to the slip across the clutch. For example, when the slip is small, the clutch apply rate will be fast. Similarly, if the slip is large, the clutch engagement may be smoother, over a longer period of time.

If, from decision block 166, it is found that the control system is not in the special start mode, then an inquiry is made at decision block 190 as to whether the control system is in the servo-shift inhibit mode. If so, an inquiry is made at decision block 192 as to whether the gear shift is in the reverse position. If the gear shift is not in the reverse position, then at block 194 a reverse inhibit flag is set. Next, at block 196 the control system is caused to enter the hold mode. If, from decision block 192, it is found that the gear shift is in the reverse position, then an inquiry is made at decision block 198 as to whether the reverse inhibit flag is set. If it is not set, then the control system is caused to enter the hold mode at block 196. If, however, from decision block 198, it is found that the reverse inhibit flag is set, then an inquiry is made at decision block 200 as to whether the vehicle speed is less than 7 kilometers per hour. If so, then at block 202 the reverse inhibit flag is cleared. Next, at block 196, the control system is caused to enter the hold mode. If from decision block 200, it is found that the vehicle speed is not less than 7 kilometers per hour, then at block 204, the ratio control pressure is adjusted so that, regardless of engine speed, the speed of rotation of the clutch input shaft is equal to that of the clutch output shaft. Then, at block 206 the line pressure is controlled to a minimum value of, for example, 60 psi. Next, at block 208, the clutch oil pressure is controlled to be 0 psi, a condition wherein the clutch is completely disengaged.

Referring now to FIG. 7, the state diagram of the control system of the present invention is shown, illustrating the conditions for transition between the various operational modes described above. At state 210, the control system is in the neutral mode, which is entered at any time that the gear shift is moved to the park or the neutral position. The control system enters the hold mode at state 212 via transition 214 from state 210 when the gear shift is moved into the reverse, the drive, the manual 1 or the manual 2 position. From the hold mode, at state 212, the control system can enter the normal start mode, at state 216, via transition 218 when the driver demand switch is engaged and the vehicle speed is less than 7 kilometers per hour. From the normal start mode, at state 216, the control system can enter the drive mode, at state 218, via transition 220, when the driver demand switch is closed and the vehicle speed is greater than 7 kilometers per hour and the clutch slip is less than a predetermined amount which, in the illustrated embodiment, is 20 rpm. "Clutch slip" is defined as the absolute value of the difference between the rotational speed of the clutch input shaft and the rotational speed of the output shaft.

The control system can enter the hold mode, at state 212, from the drive mode, at state 218, via transition 222 when the engine speed is less than 1,000 rpm or the vehicle speed is less than 7 kilometers per hour.

From the hold mode, at state 212, the control system can enter the special start mode, at state 224, via transition 226 when the gear shift is not in reverse and the vehicle speed is greater than 7 kilometers per hour and either (1) the driver demand switch is engaged or (2) the speed of the clutch output shaft multiplied by the chain ratio is between 1,000 rpm and 6,000 rpm or (3) the gear shift is in the manual 1 or manual 2 position or (4) the ratio is in full overdrive (full high ratio). From the special start mode, at state 224, the control system can enter the drive mode at state 218, via transition 228 when the vehicle speed is greater than 7 kilometers per hour and the speed of the clutch output shaft multiplied by the chain ratio is greater than 1,400 rpm and the clutch slip is less than 20 rpm.

The hold mode, at state 212, can be entered from the normal start mode, at state 216, via transition 230 when the driver demand switch is disengaged. Likewise, the hold mode, at state 212, can be entered from the special start mode at state 224, via transition 232 when the gear shift is not in the reverse position and the vehicle speed is less than 7 kilometers per hour. The normal start mode, at state 216, can be entered from the special start mode, at state 224, via transition 234 when the gear shift is not in reverse and the vehicle speed is greater than 7 kilometers per hour and the speed of the clutch output shaft multiplied by the chain ratio is less than 1,400 rpm.

The servo-shift inhibit mode, at state 236, can be entered from the hold mode, at state 212, via transition 238 when the gear shift is in the reverse position and the reverse inhibit flag is set. The hold mode, at state 212, can be entered from the servo-shift inhibit mode, at state 236, via transition 240 when the gear shift is not in the reverse position or the reverse inhibit flag is clear or the vehicle speed is less than 7 kilometers per hour. The servo-shift inhibit mode, at state 236, can be entered from the special start mode, at state 224, via transition 242 when the gear shift is in the reverse position.

The above illustrative embodiment depicts a control method and apparatus for continuously variable transmissions. Each aspect of the illustrated embodiment is exemplary, and the scope of the invention is not intended to be limited to the specific embodiments shown or described. Rather, the scope of the invention is intended to encompass those modifications and variations that may be apparent to those persons skilled in the art to which the subject matter pertains.

I claim:

1. A method for controlling a variable ratio of a vehicular continuously variable transmission having a slipably engageable clutch, such method comprising the steps of:

setting said variable ratio equal to an extreme low ratio and fully disengaging the clutch when a gear shift of the vehicle is in a neutral position;

maintaining said variable ratio in said extreme low ratio and slightly engaging the clutch to cause a finite amount of vehicle creep when the gear shift is in a forward or reverse position and a throttle of the vehicle is in a fully released position;

maintaining said variable ratio in said extreme low ratio and partially engaging the clutch to a degree sufficient to maintain the rotational speed of an engine of the vehicle at a first predetermined set point speed when the gear shift is in a forward or reverse position and the throttle is moved to a depressed position; and transferring engine speed control from the clutch to said continuously variable transmission by adjustably setting said variable ratio to maintain the rotational speed of the engine at a second predetermined engine set point speed and fully engaging the clutch when the gear shift is in a forward or reverse position and the vehicle is travelling at greater than a predetermined minimum vehicle speed and the throttle is in a depressed position and the clutch is slipping at less than a predetermined amount.

2. The method of claim 1 wherein said first predetermined set point speed is a function of throttle position.

3. The method of claim 1 wherein said second predetermined set point speed is a function of throttle position.

4. The method of claim 1 wherein said predetermined minimum vehicle speed is equal to seven kilometers per hour.

5. The method of claim 1 wherein said predetermined amount of clutch slip is twenty revolutions per minute.

6. A method for controlling a continuously variable transmission for coupling torque from an engine to driving wheels of a powered vehicle and having a ratio variable between an extreme low ratio and an extreme high ratio and further having a slipably engageable clutch with an input shaft and an output shaft, said method comprising the steps of:

setting said variable ratio to an extreme low ratio and fully disengaging the clutch in response to a gear shift of the vehicle being in a neutral position;

maintaining said variable ratio in said extreme low ratio and slightly engaging the clutch to cause a finite amount of vehicle creep in response to the gear shift being in a forward or reverse position at a time when a throttle of the vehicle is in a fully released position and the vehicle is travelling at less than a predetermined minimum vehicle speed;

maintaining said variable ratio in said extreme low ratio and partially engaging the clutch to a degree sufficient to maintain the rotational speed of the engine at a predetermined set point value, the set point value being a function of the throttle position, in response to the gear shift being in a forward or reverse position and the vehicle travelling at less than said predetermined minimum vehicle speed at a time when the throttle is moved to a depressed position;

setting said variable ratio to a fixed value and partially engaging the clutch to a degree proportional to both the passage of time and the difference between the rotational speeds of the clutch input shaft and the clutch output shaft in response to the gear shift being in a forward or neutral position and the vehicle travelling at greater than said predetermined minimum vehicle speed at the occurrence of at least one triggering event from a set of triggering events comprising: the throttle moving to a depressed position, the rotational speed of the clutch output shaft multiplied by said fixed value being within a predetermined range, the gear shift being in a position calling for a manual low ratio, and the variable ratio equalling the extreme high ratio; said fixed value being the ratio at the occurrence of said triggering event; and adjustably setting said variable ratio to maintain a predetermined engine set point speed, the engine set point speed being a function of throttle position, and fully engaging said clutch in response to the gear shift being in a forward position and the vehicle travelling at greater than said predetermined minimum vehicle speed at a time when the throttle is in a depressed position and the difference between the rotational speeds of the clutch input shaft and the clutch output shaft is less than a predetermined amount of clutch slip.

7. The method of claim 6 wherein said predetermined minimum vehicle speed is equal to seven kilometers per hour.

8. The method of claim 6 wherein said predetermined range is from one thousand revolutions per minute to six thousand revolutions per minute.

9. The method of claim 6 wherein said predetermined amount of clutch slip is twenty revolutions per minute.

10. The method of claim 6 further comprising the step of setting the variable ratio to equalize the rotational speeds of the clutch input shaft and the clutch output shaft and fully disengaging the clutch in response to the gear shift being moved to a reverse position at a time when the vehicle is travelling forward at greater than said predetermined minimum vehicle speed.

11. A method for controlling a continuously variable transmission for coupling torque from an engine to driving wheels of a powered vehicle and having a ratio variable between an extreme low ratio and an extreme high ratio and further having a slipably engageable clutch with an input shaft and an output shaft, said method comprising the steps of:

setting said variable ratio to an extreme low ratio and fully disengaging the clutch in response to a gear shift of the vehicle being in a neutral position at a time when the vehicle is travelling at less than a predetermined minimum vehicle speed;

setting the variable ratio to equalize the rotational speeds of the clutch input shaft and the clutch output shaft and fully disengaging the clutch in response to the gear shift being in a neutral position at a time when the vehicle is traveling at greater than said predetermined minimum vehicle speed;

maintaining said variable ratio in said extreme low ratio and slightly engaging the clutch to cause a finite amount of vehicle creep in response to the gear shift being in a forward or reverse position at a time when a throttle of the vehicle is in a fully released position and the vehicle is travelling at less than said predetermined minimum vehicle speed;

setting the variable ratio to equalize the rotational speeds of the clutch input shaft and the clutch output shaft and slightly engaging the clutch to cause a finite amount of vehicle creep in response to the gear shift being in a forward or reverse position at a time when the throttle is in a fully released position and the vehicle is traveling at greater than said predetermined minimum vehicle speed and the engine is rotating at less than a predetermined minimum engine speed;

maintaining said variable ratio in said extreme low ratio and partially engaging the clutch to a degree sufficient to maintain the rotational speed of the engine at a predetermined set point value, said predetermined set point value being a function of the throttle position, in response to the gear shift being in a forward or reverse position and the vehicle travelling at less than said predetermined minimum vehicle speed at a time when the throttle is moved to a depressed position;

setting the variable ratio to a fixed value and partially engaging the clutch to a degree proportional to both the passage of time and the difference between the rotational speeds of the clutch input shaft and the clutch output shaft in response to the gear shift being in a forward or neutral position and the vehicle travelling at greater than said predetermined minimum vehicle speed at the occurrence of at least one triggering event from a set of triggering events comprising: the throttle moving to a depressed position, the rotational speed of the clutch output shaft multiplied by said fixed value being within a predetermined range, the gear shift being in a position calling for a manual low ratio, and the variable ratio equally the extreme high ratio; said fixed value being the ratio at the occurrence of said triggering event; and adjustably setting said variable ratio to maintain a predetermined engine set point speed, said predetermined engine set point speed being a function of throttle position, and fully engaging said clutch in response to the gear shift being in a forward position and the vehicle travelling at greater than said predetermined minimum vehicle speed at a time when the throttle is in a depressed position and the difference between the rotational speeds of the clutch input shaft and the clutch output shaft is less than a predetermined amount of clutch slip.

12. An apparatus for controlling a variable ratio of a vehicular continuously variable transmission having a slipably engageable clutch said apparatus comprising:

means for setting said variable ratio to an extreme low ratio and for fully disengaging the clutch in response to a gear shift of the vehicle being in a neutral position;

means for maintaining said variable ratio in said extreme low ratio and for slightly engaging the clutch to cause a finite amount of vehicle creep when the gear shift is in a forward or reverse position and a throttle of the vehicle is in a fully released position;

means for maintaining said variable ratio in said extreme low ratio and for partially engaging the clutch to a degree sufficient to maintain the rotational speed of an engine of the vehicle at a first predetermined set point speed when the gear shift is in a forward or reverse position and the throttle is moved to a depressed position; and means for transferring engine speed control from the clutch to said continuously variable transmission by adjustably setting said variable ratio to maintain the rotational speed of the engine at a second predetermined engine set point speed and for fully engaging said clutch when the gear shift is in a forward or reverse position and the vehicle is travelling at greater than a predetermined minimum vehicle speed and the throttle is in a depressed position and the clutch is slipping at less than a predetermined amount.

13. An apparatus for controlling a continuously variable transmission for coupling torque from an engine to driving wheels of a powered vehicle and having a ratio variable between an extreme low ratio and an extreme high ratio and further having a slipably engageable clutch with an input shaft and an output shaft, said apparatus comprising:

means for setting said variable ratio to an extreme low ratio and for fully disengaging the clutch in response to a gear shift of the vehicle being in a neutral position;

means for maintaining said variable ratio in said extreme low ratio and for slightly engaging the clutch to cause a finite amount of vehicle creep in response to the gear shift being in a forward or a reverse position at a time when a throttle of the vehicle is in a fully released position and the vehicle is travelling at less than said predetermined minimum vehicle speed;

means for maintaining said variable ratio in said extreme low ratio and for partially engaging the clutch to a degree sufficient to maintain the rotational speed of the engine at a predetermined set point value, the set point value being a function of the throttle position, in response to the gear shift being in a forward or reverse position and the vehicle travelling at less than said predetermined minimum vehicle speed at a time when the throttle is moved to a depressed position;

means for setting the variable ratio to a fixed value and for partially engaging the clutch to a degree proportional to both the passage of time and the difference between the rotational speeds of the clutch input shaft and the clutch output shaft in response to the gear shift being in a forward or neutral position and the vehicle travelling at greater than said predetermined minimum vehicle speed at a triggering time when either the throttle is moved to a depressed position or the rotational speed of the clutch output shaft multiplied by said fixed value is within a predetermined range of the gear shift is in a position calling for a manual low ratio or the variable ratio is equal to the extreme high ratio, said fixed value being the ratio at said triggering time; and means for adjustably setting said variable ratio to maintain a predetermined engine set point speed, the engine set point speed being a function of throttle position, and for fully engaging said clutch in response to the gear shift being in a forward position and the vehicle travelling at greater than said predetermined minimum vehicle speed at a time when the throttle is in a depressed position and the difference between the rotational speeds of the clutch input shaft and the clutch output shaft is less than a predetermined amount of clutch slip.

* * * * *

UNITED STATES PATENT AND TRADEMARK OFFICE
CERTIFICATE OF CORRECTION

PATENT NO. : 5,062,049

DATED : October 29, 1991

INVENTOR(S) : Danny R. Taylor

It is certified that error appears in the above-identified patent and that said Letters Patent is hereby corrected as shown below:

In column 1, line 28, after "jerking" please insert --,--.

In column 2, line 39, after "2a-2e" please delete "is" and substitute therefor --are--; delete "chart" and substitute therefor --charts--.

Signed and Sealed this

Twenty-second Day of June, 1993

Attest:

MICHAEL K. KIRK

*Attesting Officer*      *Acting Commissioner of Patents and Trademarks*